UNITED STATES PATENT OFFICE.

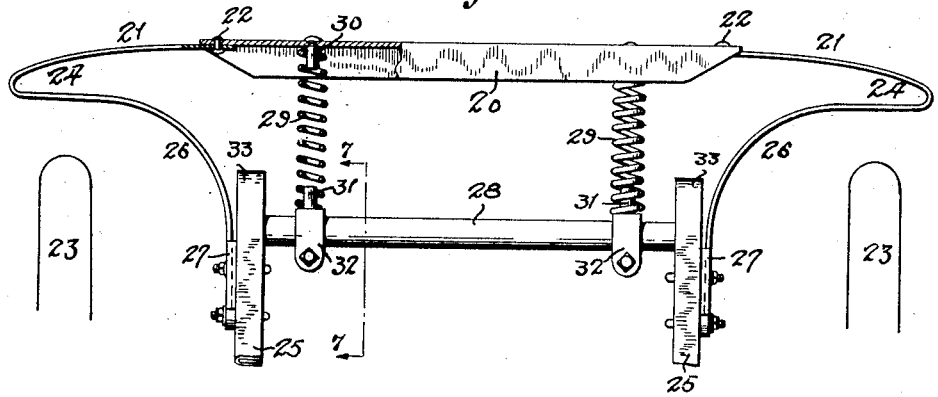
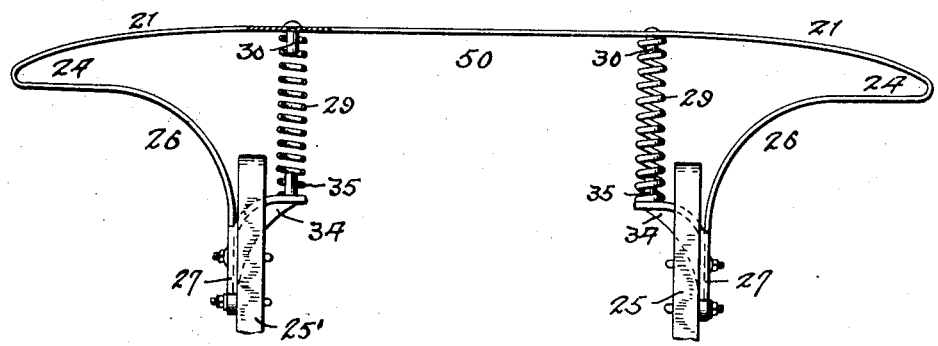
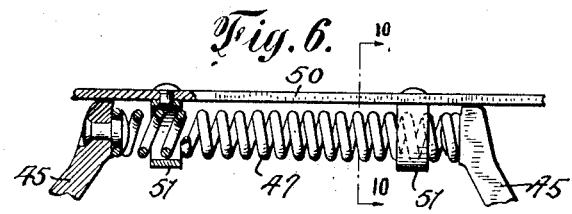
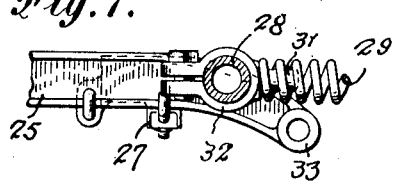

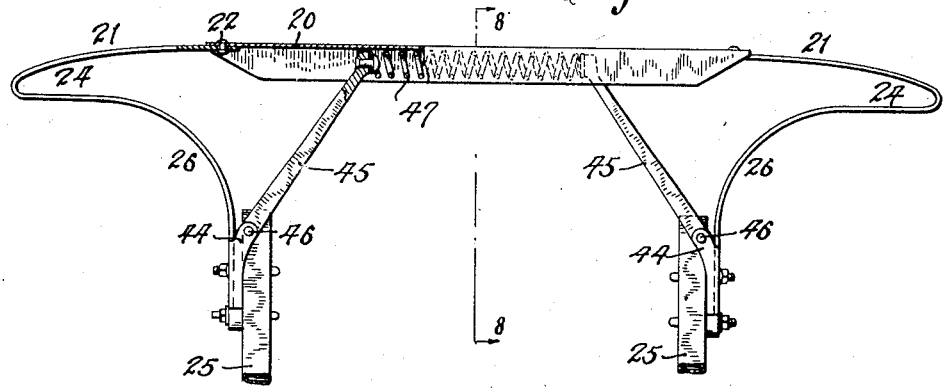
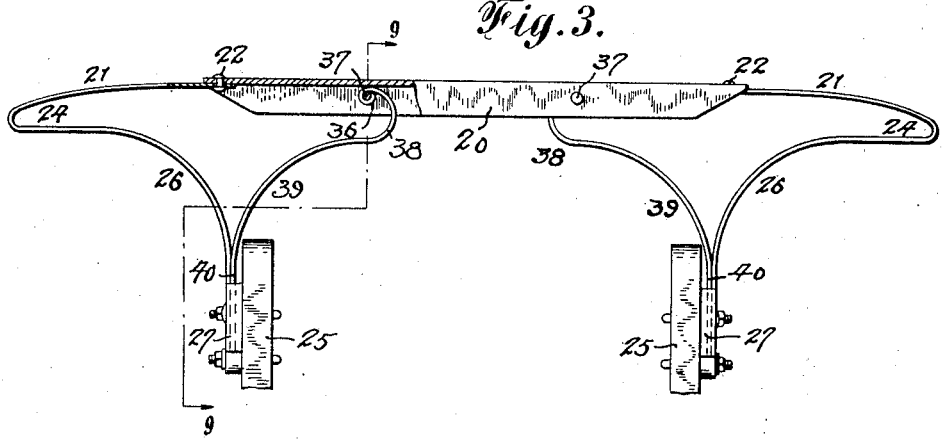
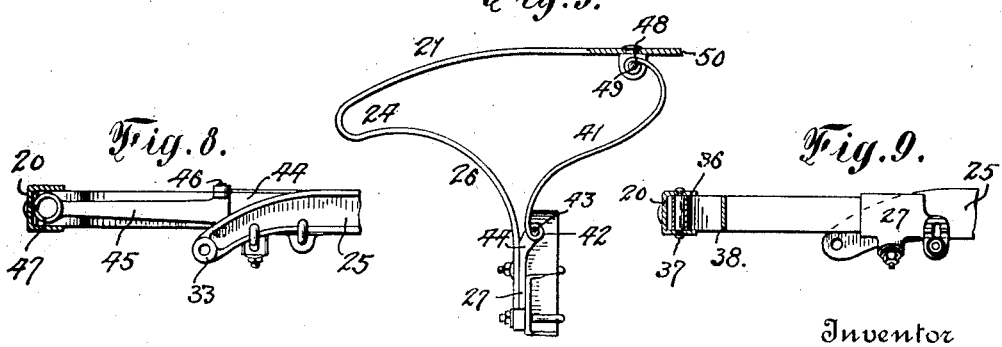

RICHARD T. NEWTON, OF NEW YORK, N. Y.

BUMPER.

1,346,667.  Specification of Letters Patent.  Patented July 13, 1920.

Application filed October 26, 1918. Serial No. 259,802.

*To all whom it may concern:*

Be it known that I, RICHARD T. NEWTON, a citizen of the United States of America, residing in the city, county, and State of New York, have invented certain new and useful Improvements in Bumpers, of which the following is a specification.

My invention relates to bumpers and particularly to bumpers for automobiles and the like, the object of my invention being to provide a bumper of economical construction having novel features of improvement hereinafter pointed out or illustrated in the accompanying drawings, in which—

Figures 1 to 4 inclusive are broken plan views of several different embodiments of my invention;

Fig. 5 is a broken partial section of a further modification;

Fig. 6 is a similar view of another modification; and

Figs. 7 to 10 are respectively sections on the lines 7—7, Fig. 1, 8—8, Fig. 4, 9—9, Fig. 3, and 10—10, Fig. 6.

In the construction shown in Fig. 1, the present bumper comprises a rigid impact member 20 of channel section. At each end this impact member of the bumper is supported by a strap of resilient flat metal, the portion 21 of which forms an extension of the impact member, to which it is rigidly secured at 22 by riveting or the like. The sections 21 extend outwardly a sufficient distance to protect the wheels 23, and are then recurved at 24 and carried into the chassis side bar 25 on a reversed gradual curve 26, presenting its convex face toward the impact member 20. Clamping brackets 27 of any suitable type rigidly secure the ends of the straps to the outer faces of the chassis side bars 25, to which the thrust of the bumper is thus transmitted. A supporting cross bar or tube 28 stretches between the chassis side bars and forms an abutment against which auxiliary springs 29 of the bumper thrust. These springs are here shown as coil springs, the outer ends of which lie within the channel of the impact member 20 and are held in position by thimbles 30 riveted to the bar 20 at points symmetrically spaced equidistantly from the center of the bumper and preferably slightly inward from the planes of the chassis side bars 25. The inner ends of the springs 29 are seated against the thimble 31 mounted on the cross bar 28 by means of clamps 32.

Inasmuch as the channel 20, spring end straps 21, and coil springs 29, are all of stock material or readily fabricated, the economy of the construction will be readily recognized. The clamps 27 are secured in position by hook bolts and thus form an attachment for the bumper which involves no drilling of holes in the chassis side bar or disturbance of the main spring bolts which pass through the usual holes in the ends of the downturned horns 33. This is equally true of the clamp 32 which embraces the cross bar 28 and carries the thimbles 31. The bumper construction is well adapted to its utility, inasmuch as all thrusts, whether head-on or tangential, are resisted by both the coil springs 29 and by the spring bends 24 and 26 of the end straps, the rigid impact member 20 aiding materially in transmitting the strains of tangential thrusts to both coil springs. The bumper is also free to yield laterally under "hook" thrusts from behind, by reason of the flexibility of the end straps and the coil springs, which are not rigidly incased.

In Fig. 2 I have shown a modified construction in which the chassis has no cross bar 28. In such case, an inwardly projecting lug 34 is formed on the bracket 27 and carries a stud 35 corresponding in function to the thimble 31.

The construction shown in Fig. 3 differs from that first described in that the auxiliary springs are of spring strap metal, similar in character to the end supports. In the form here shown, these auxiliary springs have, at their outer ends, eyes 36 through which freely pass the pins 37 riveted to the upper and lower flanges of the channel 20. These pins may be located at any convenient point, but preferably at points equidistant from the middle of the channel and symmetrically spaced from the ends thereof. The springs have a general S shape, with bends 38 presenting their convex faces toward each other and their opposite bends 39 faced outwardly. The latter terminate in straight reaches 40 which lie against similar portions of the end spring straps and are engaged with the latter by the same clamp brackets 27.

In this construction the auxiliary springs not only reinforce the end springs in all thrusts, head-on or glancing, but also aid in supporting the impact channel member 20.

In Fig. 5 an auxiliary spring 41 of the same general type is shown, differing from that just described in that its bracket end is provided with an eye 42, through which passes a pivot pin 43 mounted on a bracket lug 44. This gives additional flexibility to the springs without lessening their strength.

In Fig. 4 the auxiliary flexible support is provided by strut arms 45 pivoted at 46 to the lug 44 on the bracket and bearing, at their outer ends, freely against the inner face of the channel 20. Between the outer ends of the strut arms is arranged a coil spring 47, tending constantly to force the latter apart. It is obvious that, upon a head-on thrust against the bumper, the outer ends of the strut arms 45 are forced toward each other against the action of the spring 47. A tangential thrust against the bumper would cause one arm to move farther than the other, the latter remaining stationary, or practically so, and forming an abutment against which the coil spring 47 is compressed.

In this construction, as in those just described, the strut arm aids in supporting the weight of the impact channel member 20.

In Fig. 2 I have omitted the channel 20 and extended the impact portion 21 of the end spring toward the center of the bumper so that it now forms the main as well as the end impact member of the bumper. In combination with it may be arranged any of the auxiliary spring devices above described. Thus, by attaching thereto at 48 (Fig. 5) a clip to carry the pivot pin 49, the eye 42 at the outer end of the auxiliary spring 41 may be jointed to the impact area 50 of the spring and afford the same reinforcement as in the constructions above described. Similarly (see Fig. 6) by attaching to the impact area of the spring a guide loop 51 or small channel bracket, the coil spring 47 of Fig. 4 may be held in position behind the impact area 50 of the main spring and the strut arms thereby properly positioned.

While I have described the intermediate springs as auxiliary springs, it is to be distinctly understood that they may be of greater strength and resistance to thrusts against the bumper than the end straps, and I do not limit my invention to any particular relative capacities for these springs.

Obviously, various modifications in detail of construction and arrangement may be made without departing from what I claim as my invention.

I claim:

1. An automobile bumper comprising a central impact area, and opposite end areas in extension of the impact area, said end areas comprising strips of resilient flat metal recurved toward the automobile, said recurved area being bowed toward the impact area, together with a mid-support for the impact area of the bumper, said mid-support comprising independent resilient members engaging the impact area of the bumper at points spaced between the end areas and the center of the mid-area, and means rigid with the automobile engaged by said mid support and taking the thrust thereof, for the purpose described.

2. In an automobile bumper, a rigid, central impact member of channel section and end supports therefor comprising straps of resilient spring metal secured to said channel section at its opposite ends and arranged in extension thereof, the outer ends of said straps being recurved toward the automobile and bowed toward the impact section.

3. In combination with a construction such as specified in claim 2, a mid-support for the impact channel section comprising yielding members engaging the latter at symmetrically spaced points intermediate the end straps.

4. In a construction such as specified in claim 2, a mid-support for the impact channel section comprising spring members engaging the latter intermediate the end straps and at points symmetrically spaced on opposite sides of the center of the impact member.

5. In combination with a construction such as specified in claim 2, a mid support for the impact section comprising yielding members engaging the latter at points intermediate the end straps and spaced equidistantly from the center of the impact member, together with supports therefor independent of the supports for the end springs of the bumper.

6. In a construction such as specified in claim 5, said yielding members comprising coil springs.

7. An automobile bumper comprising a mid-impact area, and opposite end impact areas in extension of the mid-impact area, said end impact areas comprising resilient flat metal strap means recurved and secured at their inner ends to the side members of the automobile chassis, said recurved area being bowed toward the impact area, together with a yielding mid-support for the impact area of the bumper, said mid-support comprising independent members engaging the impact element at points spaced between the end areas and the center of the mid-area, and means rigid with the automobile engaged by said mid-support and taking the thrust thereof, for the purpose described.

8. An automobile bumper comprising a mid-impact area, and opposite end impact areas in extension of the mid-impact area, said end impact areas comprising resilient flat metal strap means recurved and secured at their inner ends to the side members of the automobile chassis, said recurved area being bowed toward the impact area, together with a yielding mid-support for the impact area of the bumper, said mid-support comprising independent resilient members engaging the impact element at points spaced between the end areas and the center of the said area, and means rigid with the automobile engaged by said resilient members and taking the thrust thereof, for the purpose described.

In testimony whereof I have signed my name to this specification.

RICHARD T. NEWTON.